(12) United States Patent
Kuo

(10) Patent No.: US 8,940,162 B2
(45) Date of Patent: Jan. 27, 2015

(54) METHOD AND APPARATUS FOR PROCESSING WASTEWATER AFTER DE-SIZING

(75) Inventor: Chi-Chang Kuo, Taichung (TW)

(73) Assignee: New Century Membrane Technology Co., Ltd., Taichung (TW)

(*) Notice: Subject to any disclaimer, the term of this patent is extended or adjusted under 35 U.S.C. 154(b) by 705 days.

(21) Appl. No.: 13/241,297

(22) Filed: Sep. 23, 2011

(65) Prior Publication Data

US 2013/0075330 A1    Mar. 28, 2013

(51) Int. Cl.
| | |
|---|---|
| C02F 1/44 | (2006.01) |
| C02F 1/66 | (2006.01) |
| C02F 1/68 | (2006.01) |
| C02F 9/00 | (2006.01) |
| B01D 61/14 | (2006.01) |
| B01D 61/18 | (2006.01) |
| B01D 63/08 | (2006.01) |
| B01D 63/16 | (2006.01) |
| C02F 1/00 | (2006.01) |
| C02F 1/02 | (2006.01) |
| C02F 3/34 | (2006.01) |
| C02F 11/12 | (2006.01) |
| C02F 101/30 | (2006.01) |
| C02F 101/34 | (2006.01) |
| C02F 103/14 | (2006.01) |

(52) U.S. Cl.
CPC .............. *B01D 61/145* (2013.01); *B01D 61/18* (2013.01); *B01D 63/084* (2013.01); *B01D 63/16* (2013.01); *C02F 9/00* (2013.01); *C02F 1/66* (2013.01); *C02F 1/004* (2013.01); *C02F 1/02* (2013.01); *C02F 1/441* (2013.01); *C02F 1/444* (2013.01); *C02F 3/342* (2013.01); *C02F 11/12* (2013.01); *B01D 2315/02* (2013.01); *C02F 2101/308* (2013.01); *C02F 2101/34* (2013.01); *C02F 2103/14* (2013.01); *C02F 2303/16* (2013.01)
USPC .................. 210/202; 127/1; 127/23; 127/24; 210/200; 210/201; 210/203; 210/259; 435/95

(58) Field of Classification Search
USPC .......... 127/1, 23, 24; 210/200, 201, 202, 203, 210/259; 435/95
See application file for complete search history.

(56) References Cited

U.S. PATENT DOCUMENTS

| 3,720,583 A * | 3/1973 | Fisher | ............................. 435/95 |
| 6,036,854 A * | 3/2000 | Potter | ........................... 210/202 |

* cited by examiner

Primary Examiner — David A Reifsnyder

(57) ABSTRACT

Disclosed is a method for processing wastewater after de-sizing. The method includes the step of executing a preliminary treatment on the wastewater to intercept slurry and to stabilize the quality of the wastewater, the step of reducing the pH of the wastewater to a range between 6.0 and 7.5, the step of providing a refractory degradation material 30 for hydrolyzing and hence liquidating starch slurry in the wastewater, the step of separating solids from liquid of the wastewater; and the step of recycling the liquid.

4 Claims, 3 Drawing Sheets

METHOD AND APPARATUS FOR PROCESSING WASTEWATER AFTER DE-SIZING

BACKGROUND OF INVENTION

1. Field of Invention

The present invention relates to de-sizing and, more particularly, to an inexpensive and environmentally friendly method and apparatus for processing wastewater after de-sizing.

2. Related Prior Art

In dyeing, after de-sizing, there is inevitably produced a lot of wastewater including a lot of polyvinyl alcohol ("PVA"), carboxymethyl cellulose ("CMC") and adhesive. The biodegradability of PVA, which is polymer, is poor. The pH and chemical oxygen demand ("COD") of the wastewater are high. Hence, the wastewater is not suitable for direct release to the environment without any processing. Conventionally, an activated sludge process is executed to process the wastewater; however, the result is not satisfactory since the wastewater is rich of organic materials that cannot easily be degraded.

There have been attempts to process the wastewater by membrane separation. In the membrane separation, at least one ultra-filtration or reverse osmosis membrane is used to separate solids from liquid. With the membrane, pulp is removed from the wastewater, and the chromaticity of the wastewater is reduced, i.e., the wastewater is de-colored. Thus, met are regulations about the quality of wastewater to be released to the environment. That is, the pollution of the environment is reduced.

To avoid the reduction of the filtering rate of the membrane, an aeration apparatus may be used to produce erratic flows to remove deposit from the membrane. Moreover, a membrane bioreactor may be used to process the wastewater while reducing the deposit. The membrane bioreactor includes a turntable for supporting the membrane used in the activated sludge process. The turntable is used to produce a flow field to reduce the deposition of particles on the membranes.

The combination of the aeration apparatus with the membrane bioreactor is useful in reducing the blocking and encrustation on the membrane. The result of the processing with the membrane is however unsatisfactory for thick and viscous wastewater, and particularly so for wastewater that contains a lot of starch slurry. The starch slurry often sticks to the surface of the membrane or block pores in the membrane to form extremely viscous filter cakes. The membranes may be made of an anti-encrustation material to increase the life of the membranes. It is however difficult if not impossible to avoid rapid degradation of the flux through the membranes. It is also difficult if not impossible to wash way pulp from the surface of the membrane.

The present invention is therefore intended to obviate or at least alleviate the problems encountered in prior art.

SUMMARY OF INVENTION

It is an objective of the present invention to provide a method and for processing wastewater after de-sizing.

To achieve the foregoing objective, the method includes the step of executing a preliminary treatment on the wastewater to intercept slurry and to stabilize the quality of the wastewater, the step of reducing the pH of the wastewater to a range between 6.0 and 7.5, the step of providing a refractory degradation material 30 for hydrolyzing and hence liquidating starch slurry in the wastewater, the step of separating solids from liquid of the wastewater; and the step of recycling the liquid.

It is another objective of the present invention to provide an apparatus for processing wastewater after de-sizing.

To achieve the foregoing objective, the apparatus includes a fast mixer, a liquidation unit, two tanks, two pumps and a separation unit. The fast mixer is used for containing and mixing the wastewater with acid. The liquidation unit is used for receiving the wastewater from the fast mixer and for containing a degradation material for hydrolyzing and hence liquidating the wastewater. The first pump is used for pumping the wastewater into the first tank from the liquidation unit. The separation unit includes a liquid-collection tube rotationally inserted in the first tank, ultra filtration membranes provided on the liquid-collection tube in a watertight manner, and a motor operatively connected to the liquid-collection tube. The second pump is used for pumping liquid into the second tank from the liquid-collection tube.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 2:
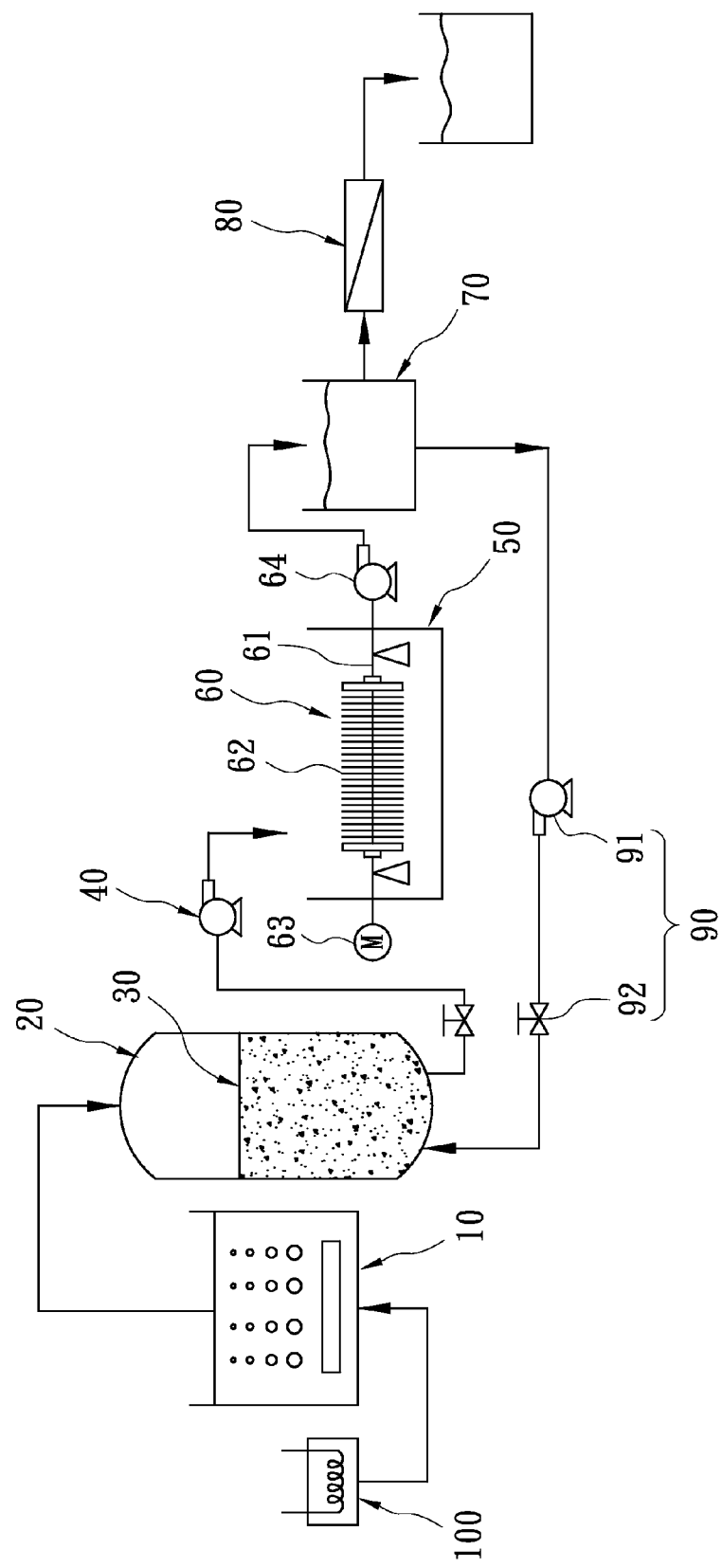
FIG. 2 is a side view of an apparatus for processing wastewater after de-sizing operable according to the method shown in FIG. 1.

Referring to FIG. 2, there is shown an apparatus for processing wastewater after de-sizing in dyeing according to the preferred embodiment. The apparatus includes a fast mixer 10, a liquidation unit 20, a degradation material 30, a pump 40, a filtration unit, a recycling unit 70, an RO unit 80, a reverse washing unit 90 and a heater 100. The fast mixer 10 may include an agitator in a tank.

Figure 3:
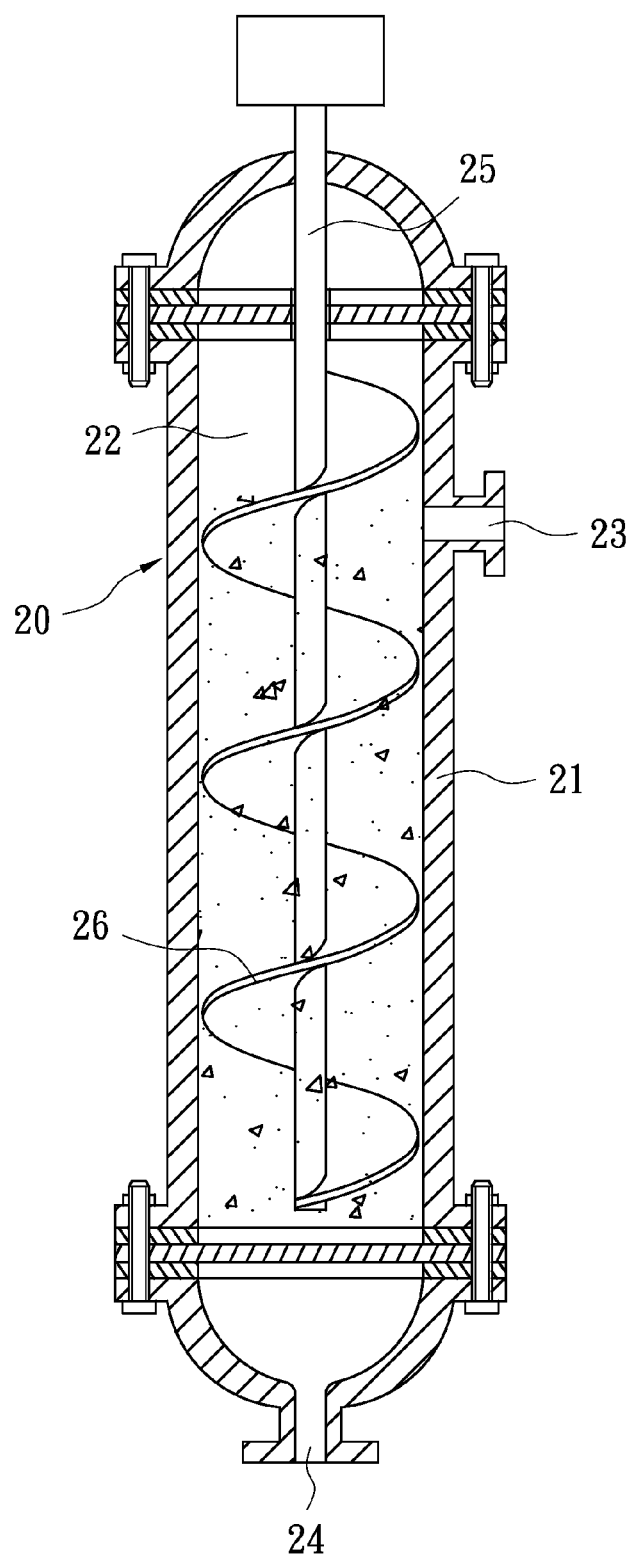
FIG. 3 is a cross-sectional view of a liquidation unit used in the apparatus shown in FIG. 2.

Referring to FIG. 3, the liquidation unit 20 includes a tank 21 and a screw rotationally inserted in the tank 21. The tank 21 includes a space 22 defined therein, an inlet 23 defined in an upper section thereof, and an output 24 defined in a lower section thereof. The inlet 23 of the tank 21 is in communication with the fast mixer 10 through a pipe.

The screw includes an axle 25 and a helical blade 26 extending on the axle 25. The axle 25 includes an end operatively connected to a motor located outside the tank 21. The space 22 is made a helical passageway because of the helical blade 26.

The degradation material 30 is filled in the tank 21. Preferably, the degradation material 30 is a refractory, porous amylase in the form of particles. More particularly, the degradation material 30 may be food-grade a-amylase SPEXYME® AA.

The pump 40 is in communication with the outlet 24 of the tank 21 through a pipe on which a valve may be provided.

The filtration unit includes a tank 50 and a separator 60 rotationally inserted in the tank 50. The tank 50 is in communication with the pump 40 through a pipe.

The separator 60 includes a liquid-collection tube 61 rotationally inserted in the tank 50 and ultra-filtration membranes 62 provided on the liquid-collection tube 61 in a watertight manner. The liquid-collection tube 61 includes an end connected to a motor 63 located outside the tank 50. Each of the ultra-filtration membranes 62 is in the form of a flat ring through which the liquid-collection tube 61 is inserted.

The recycling unit 70 is in communication with the tank 50 through a pipe on which a pump 64 is provided. The recycling unit 70 is in communication with the tank 21 through a pipe on which the reverse washing unit 90 is provided. The reverse washing unit 90 includes a pump 91 and a valve 92.

An inlet of the RO unit 80 is in communication with the recycling unit 70 through a pipe. An outlet of the RO unit 80 is in communication with another tank through another pipe.

The heater 100 is connected to the fast mixer 10.

Figure 1:
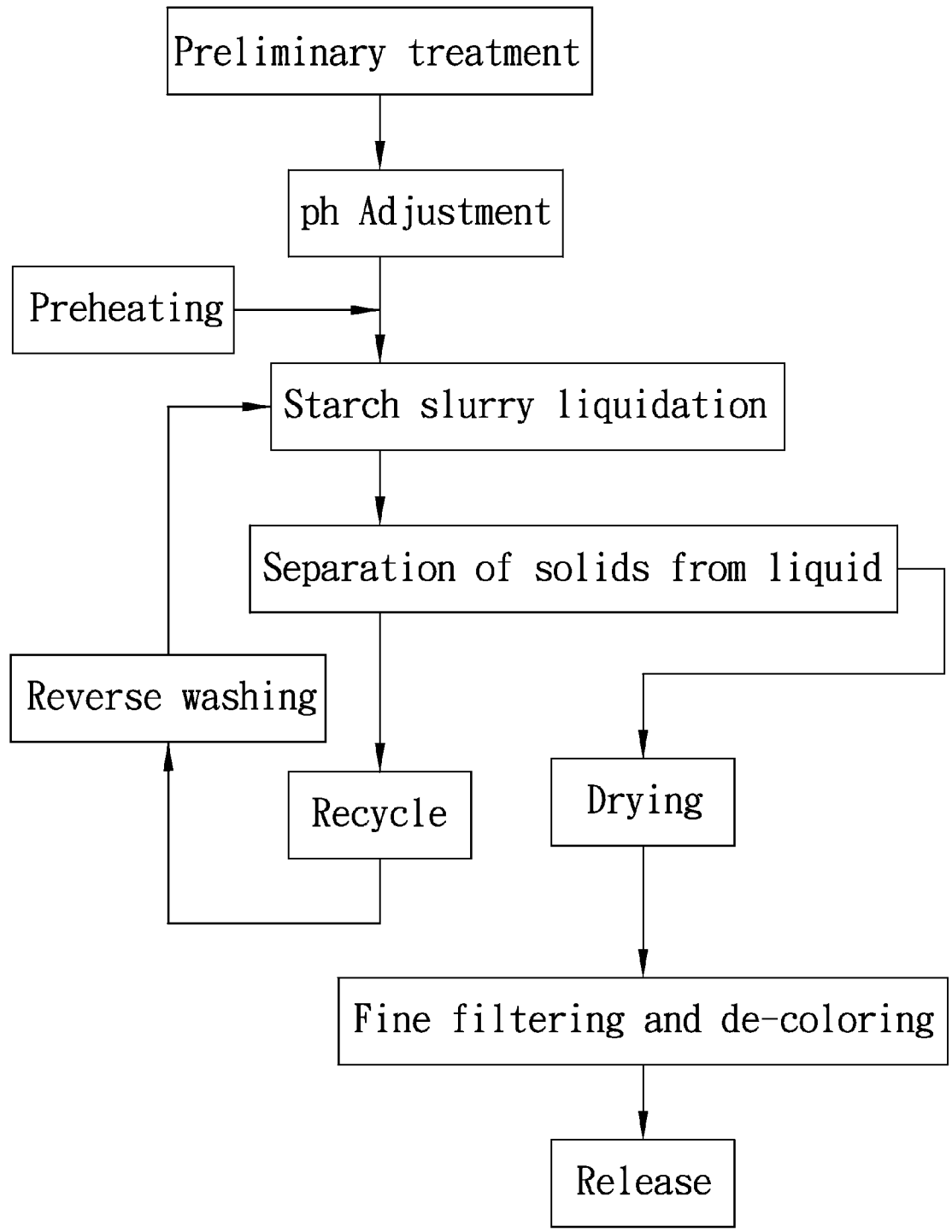
FIG. 1 is a flow chart of a method for processing wastewater after de-sizing according to the preferred embodiment of the present invention.

Referring to FIG. 1, there is shown a method for processing wastewater in the apparatus shown in FIG. 2. At first, preliminary treatment is executed on the wastewater to intercept slurry and stabilize the quality of the wastewater. The wastewater includes various pulps, de-sizing agents and dyes. To ensure smooth execution of further processing, the preliminary treatment of the wastewater is necessary. The slurry is intercepted before the wastewater is introduced into a regulation pool where the temperature and quantity of the wastewater are regulated and the quality of the wastewater is stabilized.

Then, the wastewater is introduced into the fast mixer 10 where the pH of the wastewater is regulated. Immediately after the preliminary treatment, the pH of the wastewater is about 10 to 12 and must therefore be regulated. Acid or waste acid is introduced into the fast mixer 10 and mixed with the wastewater for neutralization so that the pH of the regulated wastewater is reduced to 6.0 to 7.5. Accordingly, the chromaticity of the wastewater is reduced, i.e., the wastewater is de-colored.

After the neutralization, the wastewater is introduced into the tank 21 from the fast mixer 10 through the inlet 23 of the tank 21. The wastewater stays in the tank 21 for 3 to 10 minutes. Slowly, the wastewater travels through the helical passageway defined by the tank 21 and the helical blade 26. During the travel, the wastewater reacts with the degradation material 30. More particularly, starch slurry contained in the wastewater is hydrolyzed and liquidated by the degradation material 30.

Then, by the pump 40, the wastewater is pumped into the tank 50 from the tank 21 through the outlet 24 of the tank 21. The wastewater is subjected to a membrane separation process in the tank 50 by the separation unit 60. In the membrane separation process, the motor 63 is used to spin the liquid-collection tube 61 and therefore the ultra filtration membranes 62 while the pump 64 is used to produce vacuum on a downstream side of the ultra filtration membranes 62. Liquid of the wastewater is introduced into the liquid-collection tube 61 via pores defined in the ultra filtration membranes 62. Meanwhile, solids such as colloids and particulates of the wastewater are intercepted by the ultra filtration membranes 62 and detained in the tank 50. Thus, the solids are separated from the liquid.

Then, the liquid is introduced into the recycling unit 70 from the liquid-collection tube 61 by the pump 64.

The concentration of ions in the wastewater in the tank 50 is increased as the colloids and particulates are detained in the tank 50. The concentrated wastewater is spun and distilled.

Because only a small amount of liquid is left in the concentrated wastewater in the tank 50, the concentrated wastewater can quickly be dried and turned into filter cakes. The filter cakes can effectively be disposed of, i.e., buried.

The liquid is introduced to the RO unit 80 from the recycling unit 70. The liquid is filtered and de-colored. Now, the liquid can be released to the environment.

It should be noted that the wastewater may be heated by the heater 100 before it is introduced into the fast mixer 10 where the hydrolysis is executed. The heating may be executed by introducing hot bubbles into the fast mixer 10. Alternatively, the wastewater may be heated by cloth during the de-sizing. With the heating, the efficiency of the hydrolysis is increased. Preferably, the temperature of the wastewater is not higher than 100 degrees Celsius to avoid reduction of the efficiency of the hydrolysis.

Moreover, the degradation material 30 is an amylase in the form of particles, and is therefore used for sand filtration before the membrane separation to reduce the formation of the filter cakes and scales on the surfaces of the ultra filtration membranes 62.

Furthermore, the reverse washing unit 90 is used to clean the degradation material 30. The degradation material 30 contained in the tank 21 is washed by water introduced into the tank 21 from the reverse washing unit 90 through the outlet 24 of the tank 21. Meanwhile, the degradation material 30 is stirred by the helical blade 26 to increase the efficiency of the cleaning.

The method and apparatus for processing wastewater after de-sizing in accordance with the present invention exhibit at least two advantages. At first, the degradation material 30 is used to degrade and hydrolyze the thick starch slurry to reduce the viscosity of the wastewater and to prevent the starch slurry from covering the surfaces of the ultra filtration membranes 62. The degradation material 30 is used for sand filtering for removing the particulates from the wastewater.

Secondly, the degradation material 30 is used to reduce the ratio of the solids over the starch slurry in the wastewater to effectively reduce the formation of the filter cakes and scales on the surfaces of the ultra filtration membranes 62 in the membrane separation. Thus, the life of the ultra filtration membranes 62 is extended. Hence, the effectiveness and cost are taken into consideration by the present invention.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for processing wastewater after de-sizing including:
    a fast mixer for containing and mixing the wastewater with acid;
    a liquidation unit for receiving the wastewater from the fast mixer and for containing a degradation material for hydrolyzing and hence liquidating the wastewater;
    a first tank;
    a first pump for pumping the wastewater into the first tank from the liquidation unit;
    a separation unit including a liquid-collection tube rotationally inserted in the first tank, ultra filtration membranes provided on the liquid-collection tube in a watertight manner, and a motor operatively connected to the liquid-collection tube;
    a second tank; and a second pump for pumping liquid into the second tank from the liquid-collection tube.

2. The apparatus according to claim 1, further including a reverse osmosis unit for filtering and de-coloring the liquid contained in the second tank.

3. The apparatus according to claim 1, wherein the liquidation unit includes:
   a tank including an inlet through which the wastewater is introduced thereto and an outlet through which the wastewater is transferred into the first tank;
   an axle rotationally inserted in the tank; and
   a helical blade extending on the axle.

4. The apparatus according to claim 3, further including a reverse washing unit including:
   a pump for pumping water into the tank of the liquidation unit via the outlet of the tank of the liquidation unit; and
   a check valve located between the pump and the tank of the liquidation unit.

\* \* \* \* \*